H. O. CRAVEN.
SECTIONAL TIRE.
APPLICATION FILED NOV. 11, 1905.
902,212.
Patented Oct. 27, 1908.
3 SHEETS—SHEET 1.
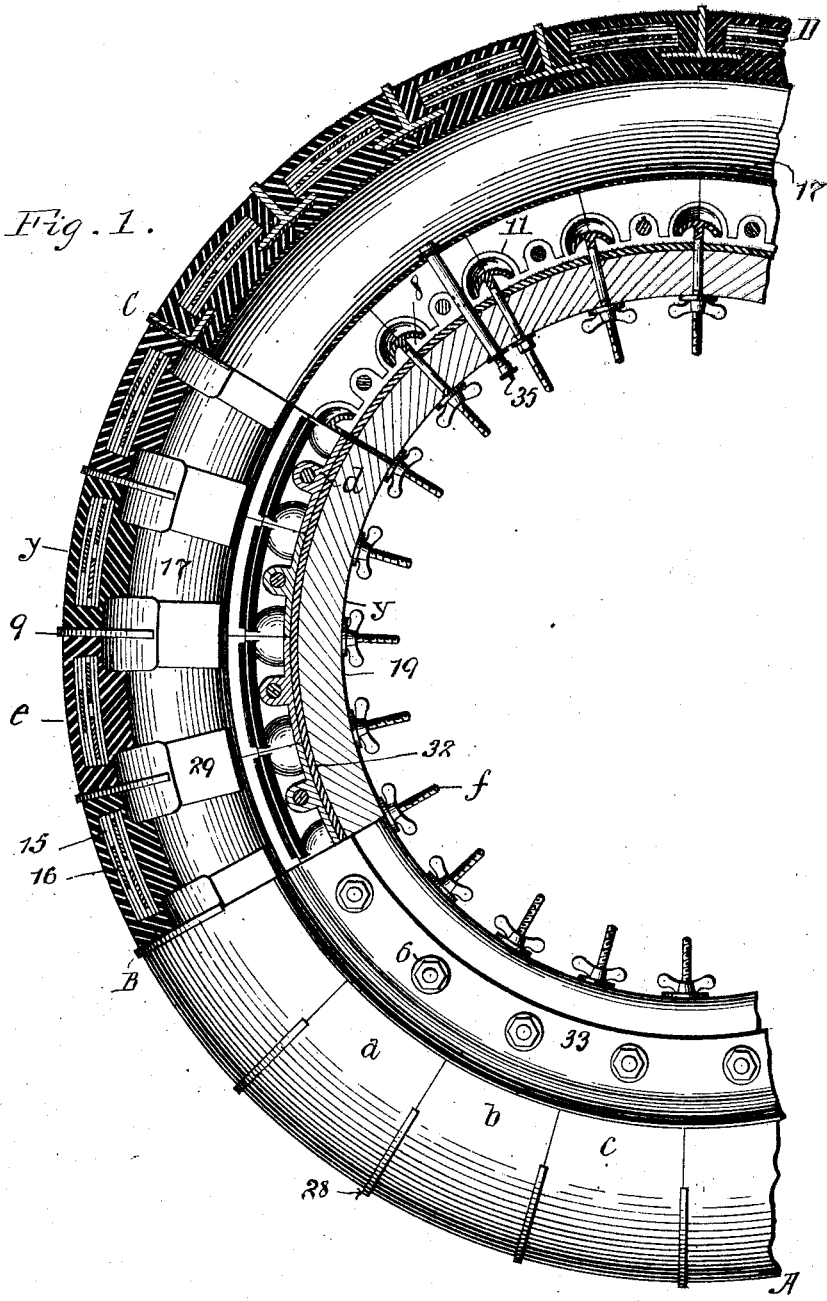

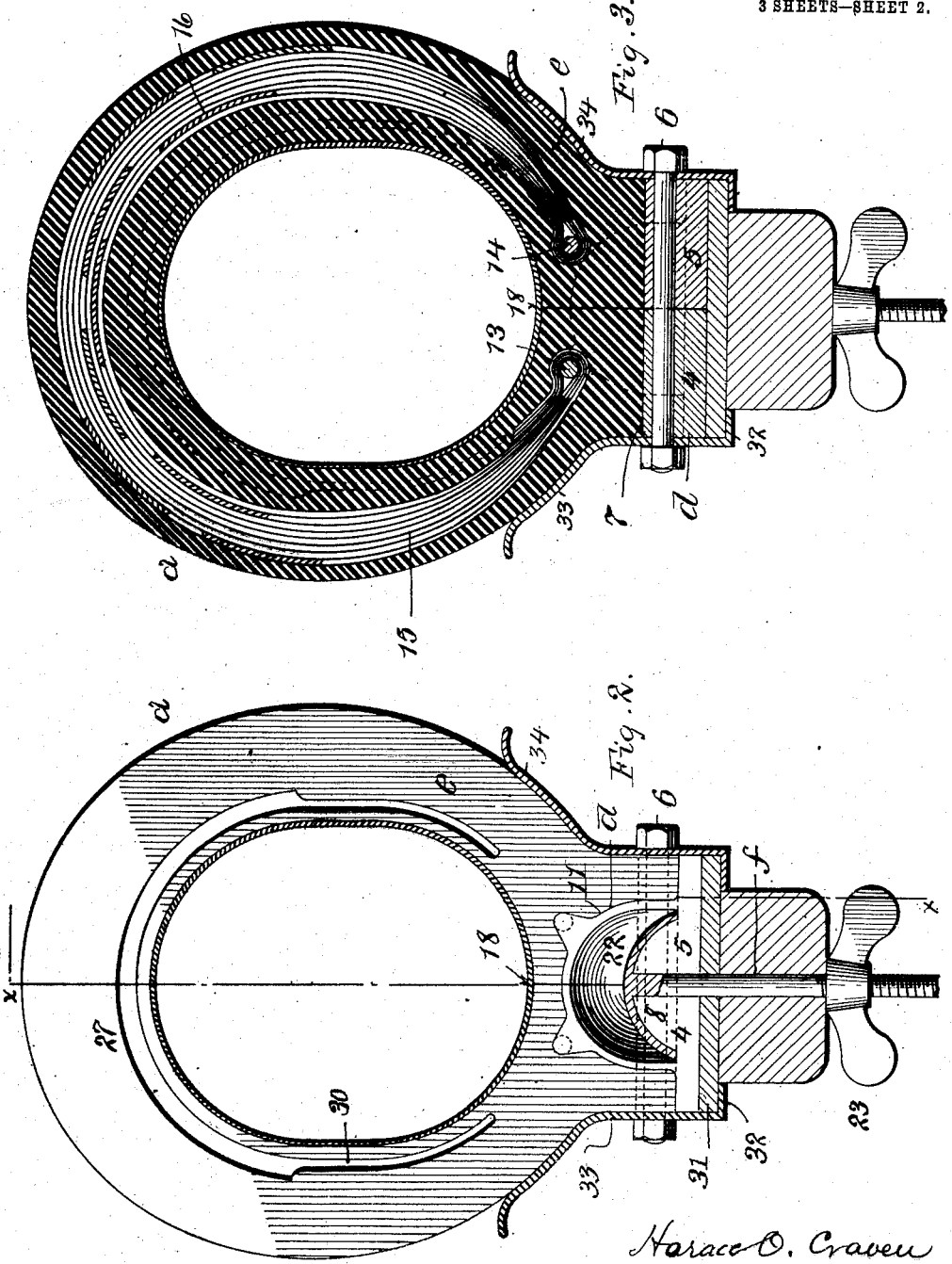

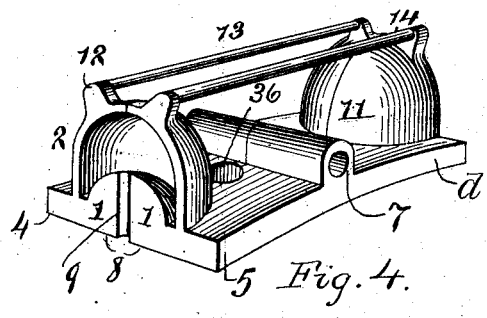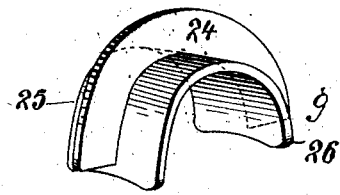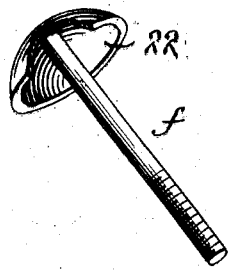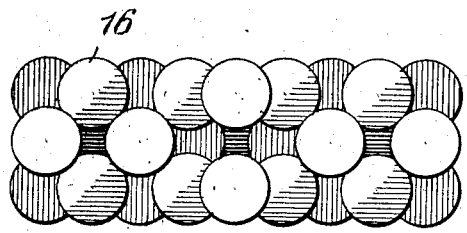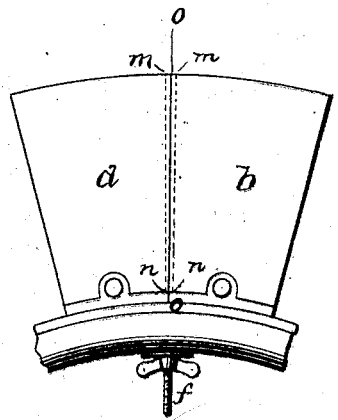

UNITED STATES PATENT OFFICE.

HORACE O. CRAVEN, OF SCHENECTADY, NEW YORK.

SECTIONAL TIRE.

No. 902,212.  Specification of Letters Patent.  Patented Oct. 27, 1908.

Application filed November 11, 1905. Serial No. 286,794.

*To all whom it may concern:*

Be it known that I, HORACE O. CRAVEN, of Schenectady, county of Schenectady, State of New York, have invented a new and useful Improvement in Sectional Tires, of which the following is a specification.

The invention relates to tires for vehicles and more especially automobiles, and belongs to that class in which there is an outer tire and an inner inflatable tube.

The object of the invention is to provide a tire made in sections, each easily attachable to and detachable from the wheel and having other advantages hereinafter set forth.

The invention consists in the construction of the individual tire sections; in a tire formed of open tubular sections connected together; in the devices for attaching the sections and the rim pieces to the wheel; in the means for preventing puncture and for guarding the joints between the sections from entrance of dust or moisture; in the placing of the elastic tire under longitudinal compression; in the construction of the metal supports for the sections and in the various combinations and instrumentalities more particularly recited in the claims.

In the accompanying drawings—Figure 1 is a partial view of a wheel felly with my improved tire in place. The part from A to B is in side elevation; the part from B to C shows the built up tire in longitudinal section on the line $x\,x$ of Fig. 2 with the joint guards and inflatable tube in elevation. The part from C to D shows a longitudinal section of all portions. Fig. 2 is an end view of one of the tire sections. Fig. 3 is a vertical section of the tire on the line $y\,y$ of Fig. 1. Fig. 4 shows in perspective one of the supports $d$ which form a part of each of the tire sections. Fig. 5 shows in perspective one of the joint guards. Fig. 6 shows in perspective one of the headed bolts for securing the tire sections on the wheel. Fig. 7 shows the arrangement in plan of the protecting metal disks. Fig. 8 represents diagrammatically two tire sections (the rim piece and nuts being removed) and illustrates the endwise compression of the elastic material of said sections when the same are secured in place.

Similar numbers and letters of reference indicate like parts.

My improved tire is composed of successive sections $a, b, c$, etc., Fig. 1. These sections are alike so that a description of one applies to all. Each section has a metal support $d$ shaped substantially as shown in perspective in Fig. 4. It is divided longitudinally into two base portions 4, 5, capable of being secured by a bolt 6, Figs. 2 and 3, passing through the opening in the lug 7 formed on said bases. At each end of the bases are upward projections 1 which when placed together form a convex lug 8 having a semi-tubular vertical recess 9 in its outer face. Extending over lug 8 are concavo-convex projections 2 which unite to form a hood-like projection 11 at each end of the support $d$ and on said projections are lugs 12 which receive the ends of two parallel rods 13 and 14.

The elastic or tread portion $e$ of each section is preferably formed upon its metal support $d$ in the following manner: A number of layers 15 of canvas or other strong textile material are connected at their ends to rods 13 and 14 by lapping said ends around said rods, as shown in Fig. 3. Between said layers on the outer portion of the tire section are interposed disks 16 of metal arranged as shown in Figs. 3 and 7; that is, so that the edges of the disks of one layer shall overlap the edges of the disks of adjacent layers. This arrangement of disks makes it impossible for any sharp object to penetrate the tire tread without striking one or more of said disks, which, therefore, prevent any puncture of said tire reaching the inner inflatable tube 17.

The canvas layers with the disks between them are embedded in the rubber portion $e$ of the tire section which is of the usual elliptical form and is molded directly on said layers and the support $d$. In the ordinary form of tire where one continuous piece of canvas goes entirely around the tire, as soon as the outer covering of rubber is injured at any point, the canvas acts like a lamp wick and soaks up moisture, so that it soon becomes weak and rotten. By embedding the layers of canvas wholly in the rubber and making them non-continuous around the wheel, if through any cause an outer layer should become exposed moisture can get no further inward than that layer and no further circumferentially than the ends of the individual injured section, which can easily be removed and a new one substituted.

The tire section is divided through the neck at 18, where its contiguous faces are flat, to form, when brought together, a close joint. The joint at 18 comes in line with the joint between parts 4 and 5 of the support d, so that when said tire section is not attached to the wheel it may be opened out laterally, the parts of the support then moving asunder. The curved bottom face of the rubber portion e rests directly upon the base of the support d and has a groove to receive the lug 7. It will be obvious, that the rubber and canvas parts of the tire section become one structure with the support d and that each tire section a, b, c, etc. is complete in itself, and that a circular tire may be built up by fastening a suitable number of sections to the wheel felly; this number, depending, of course, upon the circumferential length of said felly. This attachment I accomplish in the following manner: The wheel felly 19 has circumferential flanges 31, beneath which engage the inwardly turned flanges 32 of the loose rim pieces 33, 34. In the trough-like space between the rim pieces the tire sections a, b, c, etc. are placed end to end in series. In the rim pieces are openings, each of which comes in line with the opening in the lugs 7 of support d so that the bolts 6 which are headed and set up by a nut passing through said openings tightly clamp the rim pieces upon the felly of the wheel and also cause them to impress the necks of the tire sections and so close the joint 18 of each section.

When two tire sections as a, b, are placed on the felly, as stated, end to end, the hollow outer projections 11 as well as the lugs 8 on the support d of each section meet, and the vertical grooves 9 in the inner projections unite to form a tubular opening through which the bolt f Fig. 6, is inserted. The concave under side of the bolt head 22 then fits over the adjacent lugs 8 and its shank extends through the tubular opening formed by grooves 9 and through the wheel felly and receives on its threaded end a wing nut 23, Fig. 2. The effect of drawing the bolt f radially inward by the nut 23 is to force its head 22 down on the convexity of lugs 8, thus bringing the two contiguous tire sections closely together while at the same time securing them to the wheel. So that not only are the sections secured by the cross bolts 6 but also by the radial bolts f. The radial bolts f secure said sections at the joints between adjacent sections, and the cross bolts 6 secure each section to the wheel independently of every other section. This fastening not merely opposes any force tending to pull the tire from the felly in a direction radial to the wheel, but any force tending to pull the tire laterally from the felly or tending to bend the tire over the felly on one side and so tear it free. This arrangement is of especial importance as applied to the automobile tires since it effectually guards against all danger of tire detachment through skidding or turning of sharp corners.

In order to protect the joints between the tire sections from dust or moisture I provide the joint guards g shown separately in Fig. 5. Each guard consists of a central rib 24 having on each side curved flanges 25, 26. The rib 24 lies between adjacent tire sections and the flanges 25, 26 enter recesses formed in the contiguous end faces of the sections. The rib projects outwardly beyond the joint as shown at 28, Fig. 1, and serves to give the tire tread a better hold on the surface in which the wheel runs. In order still further to protect the joint I provide sheets 29 of rubber which extend downwardly from the flanges 25, 26 and enter continuations 30 of the flange recesses.

In building up the tire, the sections a, b, c, etc. are placed successively on the wheel felly and the radial bolts f are set up sufficiently to hold them. The sections are then drawn radially inward by further setting up of the bolts f so that their elastic portions become compressed by mutual contact. This is indicated in Fig. 8 where the amount of compression of the elastic portion of each section is the distance between each of the dotted lines m, n, and the full line o, which line o shows the joint between the sections a, b. The result is that when the tire is complete the expansive tendency of all the sections tends to force them tightly together; and, furthermore, because all of the tire surface is under initial compression, any force tending to stretch the same must first overcome the elastic resistance due to compression, before it can meet the normal elastic resistance of the rubber mass. This adds materially to the elastic life-time of the rubber; the rubber being in a compressed state is also rendered harder and denser and, therefore, less likely to become worn, abraded, torn, or punctured. After the sections are secured by bolts f the rim pieces 33, 34 are applied to the felly and tire and the cross bolts 6 are inserted and secured.

Particular attention is called to the fact that this tire is not made in sections separated from one another by partitions or the like and each separately inflated for the purpose of localizing injury due to puncture, but is composed of a plurality of open ended communicating tire sections in which an inflatable tube 17 is received when said sections are in place on the wheel. The tube is introduced into each section in turn as the section is put on the wheel. Any section can be removed from the tube by freeing its holding bolt f, removing its holding bolt 6, lifting it outward and then opening it at the joint 18. The inflatable tube is provided with the usual inflating valve arranged in a short tube 35, which passes through an opening 36 formed in the meeting edges of base parts 4 and 5 of the support d, and also radially through the felly of the wheel.

Each of my tire sections is a separate structure and, as such, may be a separate article of manufacture and sale. So also the support $d$ may be a separate article of manufacture and sale since one support will probably outlast many treads, which may be renewed as they become injured or worn out. A tire built up of such sections is easily repaired since it is necessary only to remove an injured section and replace it with a new one. The need of carrying complete extra tires in the vehicle is obviated since a few spare sections will meet all probable contingencies of road injury or wear. The tire sections are easily detachable by releasing the fastening bolts and without the aid of special appliances, beyond the wrench.

The construction of the tire renders it dust proof, water-proof and non-puncturable. The manner in which the tire is held on the wheel involving no "clencher" construction avoids all rim cutting. The inner tube being entirely surrounded by rubber is protected; and not subject to abrasion by inwardly extending bolt heads or like projections. No fastening wires are needed, and creeping of the tire is impossible.

I claim:

1. In a tire section, two end supports of metal constructed to be attached to a wheel, a layer of textile material extending between said supports and connected thereto and an outer sheathing of elastic material covering said textile material and receiving said supports.

2. In a tire section, two end supports of metal constructed to be attached to a wheel and having longitudinal rods, a plurality of layers of textile material secured at their ends to said rods and an outer sheathing of elastic material covering said textile material and receiving said supports.

3. A tire formed of sections of elastic material in split tubular form, metal supports secured to the edges thereof, means for securing the supports of each section in lateral contact and means for connecting the supports of the several sections together at their ends.

4. A tire formed of sections of elastic material in split tubular form, metallic supports secured to the edges thereof, means for securing the supports of each section in lateral contact, means for connecting the supports of the several sections together at their ends and means for securing said supports to a wheel.

5. A plurality of tire sections of elastic material in split tubular form, metallic supports secured to the edges thereof, a wheel having a circumferential recess constructed to receive said supports end to end, and means for connecting said supports at their contiguous ends to said wheel.

6. A plurality of tire sections of elastic material in split tubular form, metallic supports secured to the edges thereof, a wheel having a circumferential recess constructed to receive said supports end to end, means for connecting the walls of said recess and supports and means for connecting said supports at their contiguous ends to said wheel.

7. A plurality of tire sections of elastic material in split tubular form, metal supports secured to the edges thereof and provided at their ends with recesses, means for securing said supports in lateral contact, a device engaging in the recesses in the ends of contiguous supports and means for detachably securing said device to a wheel.

8. A plurality of tire sections of elastic material in split tubular form, metallic supports secured to the edges thereof and provided at their ends with recesses, means for securing said supports in lateral contact, a wheel felly, bolts having heads constructed to engage in recesses of contiguous ends of said supports and to pass radially through said felly, and means for securing said bolts in said felly 9. A plurality of tire sections of elastic material in split tubular form, metallic supports secured to the edges thereof and provided at their ends with recesses, means for securing said supports in lateral contact, a wheel felly, bolts having heads constructed to engage in the recesses of contiguous ends of said supports and to pass radially through said felly and means for closing the joint between said ends.

10. A plurality of tire sections of elastic material in split tubular form, metallic supports secured to the edges thereof and provided at their ends with recesses, means for securing said supports in lateral contact, a wheel felly, bolts having heads constructed to engage in recesses in contiguous ends of said supports and to pass radially through said felly, and means embedded in said ends for closing the joint between them.

11. A tire formed of elastic tubular sections, disposed end to end and secured together, and metal plates interposed between said ends and projecting beyond the circumferential surface of said tire.

12. A tire formed of elastic open tubular sections, disposed end to end and secured together, and metal plates interposed between said ends and supported on said sections.

13. A tire formed of elastic tubular sections, disposed end to end and secured together, and metal plates interposed between said ends and having lateral curved flanges received in recesses in said ends.

14. A tire formed of elastic tubular sections, disposed end to end and secured together, metal plates interposed between said ends having lateral curved flanges received in recesses in said ends and flexible extensions of said flanges received in extensions of said recesses.

15. A tire section of elastic material in split tubular form, metallic supports secured to the edges of said section and constructed to be attached to a wheel and a plurality of metal plates each embedded on all sides in the material of said section, the said plates mutually overlapping.

16. A tire formed of elastic tubular sections, a wheel, and means on said wheel for drawing each section in a direction radially to said wheel and thereby subjecting said sections to longitudinal compression.

17. A tire formed of elastic tubular sections, in contact end to end, a wheel, and means for moving said sections radially to said wheel and thereby subjecting said sections to mutual longitudinal compression.

18. As a new article of manufacture and sale, a metal support for split tubular elastic tire sections, the said support being formed in two parts, each part being provided with means for attaching to it one end of the elastic portion of the tire and means for fastening said parts together.

19. As a new article of manufacture and sale, a metal support for split tubular elastic tire sections, the said support being formed in two parts, each part being provided with means for attaching to it one end of the elastic portion of the tire, means for fastening said parts together and means conjointly acting for securing said support to a wheel.

In testimony whereof I have signed my name to this specification in the presence of two subscribing witnesses.

HORACE O. CRAVEN.

Witnesses:
WM. H. SIEGMAN,
PARK BENJAMIN, Jr.